US011537485B2

(12) United States Patent
Tsai et al.

(10) Patent No.: US 11,537,485 B2
(45) Date of Patent: Dec. 27, 2022

(54) TEST SEQUENCING METHOD, CONFIGURATION GENERATING METHOD, AND CONFIGURATION GENERATING APPARATUS FOR TESTING DEVICES ACCORDING TO THEIR COMMUNICATION PROTOCOLS

(71) Applicant: ADLINK Technology Inc., New Taipei (TW)

(72) Inventors: Chin-Te Tsai, New Taipei (TW); Chun-Hong Liu, New Taipei (TW); Quang Huy Bui, New Taipei (TW); Shih-Hsun Lin, New Taipei (TW); Yu-Yen Chen, New Taipei (TW)

(73) Assignee: ADLINK TECHNOLOGY INC., New Taipei (TW)

( * ) Notice: Subject to any disclaimer, the term of this patent is extended or adjusted under 35 U.S.C. 154(b) by 0 days.

(21) Appl. No.: 17/391,951

(22) Filed: Aug. 2, 2021

(65) Prior Publication Data

US 2022/0283920 A1    Sep. 8, 2022

(30) Foreign Application Priority Data

Mar. 4, 2021    (TW) ................. 110107721

(51) Int. Cl.
*G06F 11/26*    (2006.01)
*G06F 11/273*    (2006.01)
*G06F 11/263*    (2006.01)

(52) U.S. Cl.
CPC ........ *G06F 11/2733* (2013.01); *G06F 11/263* (2013.01); *G06F 11/2736* (2013.01)

(58) Field of Classification Search
CPC . G06F 11/2733; G06F 11/263; G06F 11/2736
See application file for complete search history.

(56) References Cited

U.S. PATENT DOCUMENTS 9,742,654 B1 *    8/2017    Barnes ............... H04L 43/50
2004/0252715 A1 *    12/2004    Noda ................. H04L 69/24
                                                                370/444

(Continued)

FOREIGN PATENT DOCUMENTS

CA    2388306 A1 *    11/2000
CN    108463812 A    8/2018

*Primary Examiner* — Joseph O Schell

(57) ABSTRACT

A configuration generating method for devices is applied to connecting ports and external devices connected to the connecting ports. The method includes the following steps: determining communication protocol types of the connecting ports respectively; generating a sequence list according to a plurality of device data, wherein each of the device data is corresponding to a communication protocol, the device data with ccTalk protocol are categorized in a first priority group, the device data with MDB protocol are categorized in a third sequence group, the device data other than those of the first priority group and the third priority group are categorized in a second priority group; and, testing the external devices sequentially and generating communication results according to the sequence list and the device data corresponding to the communication protocol types, and then generating a connecting ports configuration data of connecting ports according to the communication results.

13 Claims, 6 Drawing Sheets

(56) References Cited

U.S. PATENT DOCUMENTS

| | | | |
|---|---|---|---|
| 2005/0267655 A1* | 12/2005 | Gessner | B60R 16/0231 |
| | | | 701/29.1 |
| 2010/0180023 A1* | 7/2010 | Kraus | H04L 43/08 |
| | | | 709/224 |
| 2010/0235135 A1* | 9/2010 | Conner | H04L 69/03 |
| | | | 702/119 |
| 2013/0080832 A1* | 3/2013 | Dean | G16Z 99/00 |
| | | | 714/E11.178 |
| 2016/0154759 A1* | 6/2016 | Kakish | G06F 13/10 |
| | | | 710/33 |
| 2017/0116137 A1* | 4/2017 | Hough | G06F 13/102 |
| 2018/0131596 A1* | 5/2018 | Huh | H04L 12/2801 |
| 2020/0327083 A1 | 10/2020 | Osborne | |
| 2021/0270888 A1* | 9/2021 | Treon | G01R 29/02 |

* cited by examiner

TEST SEQUENCING METHOD, CONFIGURATION GENERATING METHOD, AND CONFIGURATION GENERATING APPARATUS FOR TESTING DEVICES ACCORDING TO THEIR COMMUNICATION PROTOCOLS

BACKGROUND OF THE INVENTION

1. Field of the Invention

The present invention relates to a test sequencing method, a configuration generating method and a configuration generating apparatus for devices, and more particularly relates to an automatically detecting external device connected to the connecting ports of the device test sequencing, the device configuration generating method and the apparatus thereof.

2. Description of the Prior Art

The connecting ports are the communication channels between one device and external devices/apparatuses. Take a computer for example, the connecting ports can be the connection holes configured on the back of the computer host. The computer can be connected to various external peripheral devices, such as screens, keyboards, projectors, mouses (mice), printers and routers, through the connecting ports. Furthermore, the operating system of the computer can be connected with the external devices for signal transmission through the connecting ports, the communication protocol with the external devices and the configuration file (or setting file) corresponding to the connecting ports and the external devices.

For some apparatuses, a plurality of connecting ports configured on the apparatus can be respectively connected to various external peripheral devices or a plurality of same external peripheral devices. However, the software protocols of the various external devices are not the same with each other. Furthermore, even the same external peripheral device may also use different software protocols due to different manufacturers or brands. Because of the incompatibility for different software protocols, the hardware characteristics of the connecting port of the apparatus and the configuration file for each connecting port need to respectively cooperate with the software communication protocols of the peripheral devices. If the user connects an external peripheral device to the wrong connecting port, the apparatus and the external peripheral device will not be able to communicate with each other.

In the existing technology, it cannot be detected whether the connecting ports of the apparatus is connected to the external peripheral device or not, and the type of the external peripheral device connected to the connecting ports cannot be detected, either. Therefore, the configuration files for the connecting ports and the external peripheral devices are usually manual written and set. However, when the quantity and variety of connecting ports and external peripheral devices are large, the developers need to spend a lot of time to set up and the errors easily occur. Furthermore, when the performance of the operation between the connecting port and the external peripheral device is not as expected, or when a lot of errors occurred need to repeatedly debug, the manpower is needed for debugging and confirmation, which will increase cost, extend the development time and reduce the efficiency.

Therefore, it is necessary to develop a novelly automatical judging mechanism and a configuration file with automatically generating mechanism for the connecting port and the external peripheral device to solve the problems of the prior art.

SUMMARY OF THE INVENTION

Therefore, the present invention provides a test sequencing method for devices to solve the problems of the prior art.

In one embodiment of the present invention, the test sequencing method for devices is configured to generate a sequence list for testing an external device connected to the connecting port. The sequence list comprises a plurality of device data and each of the device data is corresponded with a communications protocol. The test sequencing method for devices comprises the following steps: categorizing at least one of the device data into a first priority group when the communication protocol corresponding to the at least one device data is ccTalk protocol; categorizing at least one of the device data into a third priority group when the communication protocol corresponding to the at least one device data is MDB protocol; categorizing the device data other than those of the first priority group and the third priority group into a second priority group; and sequencing all of the device data according to the sequence of the first priority group, the second priority group, and the third priority group to generate the sequence list.

Wherein, each of the device data comprises a device address data, and the test sequencing method for devices further comprises the following step: categorizes at least one of the device data prior to those in the first priority group when the device address data of the at least one device data is blank.

The present invention provides a configuration generating method for devices to solve the problems of the prior art.

In one embodiment of the present invention, configuration generating method for devices is applied to a plurality of connecting ports and at least one external device respectively connected to the connecting port. The configuration generating method for devices comprises the following steps: determining a communication protocol type of each of the connecting ports respectively; generating a sequence list according to the plurality of device data; wherein each of the device data is corresponded to a communication protocol, at least one of the device data with the communication protocol of ccTalk protocol is categorized in a first priority group of the sequence list, at least one of the device data with the communication protocol of MDB protocol is categorized in the third sequence group of the sequence list, the device data other than those of the first priority group and the third priority group are categorized in a second priority group of the sequence list, and the device data are sequenced on the sequence list according to the sequence of the first priority group, the second priority group, and the third priority group; and testing the at least one external device sequentially and generating a communication result according to the sequence list and the at least one device data corresponding to the communication protocol type of the at least connecting port, and then generating a connecting port configuration file of the at least one connecting port according to the communication result.

Wherein, the step of respectively determining the communication protocol type of each of the connecting ports further comprises the following steps: testing the at least one external device connected to the at least one connecting port by a plurality of common commands; wherein each of the common commands is corresponded to one communication protocol type; and determining the at least one connecting port connected to the at least one external device that conforms to one of the common commands as the connecting port of the communication protocol type corresponding to the common command.

Wherein, each of the device data comprises a device address data, and the configuration generating method for devices further comprises the following step: categorizing at least one of the device data prior to those in the first priority group when the device address data of the at least one device data is blank.

Wherein before the step of tests, at least one external device sequentially generates a communication result according to the sequence list and at least one device data is corresponded to the communication protocol type of the at least connecting port, and then generates the connecting ports configuration data of the at least one connecting port according to the communication result: reading a history configuration file, wherein the history configuration file comprised a history configuration parameter is corresponded to the connecting ports; testing at least one external device connected to the at least one connecting port by the history configuration parameter; and deleting the history configuration file when the external device does not conform to the history configuration file.

Furthermore, wherein each of the device data comprises a device configuration parameter, tests the at least one external device sequentially and generates a communication result according to the sequence list and the at least one device data corresponding to the communication protocol type of the at least connecting port, and then generates a connecting ports configuration data of the at least one connecting port according to the communication result, which further comprises the following steps: testing the at least one external device sequentially according to the sequence list and the at least one device data corresponding to the communication protocol type of the connecting port; and updating the device configuration parameter, which is conformed to the connecting port, and to the connecting ports configuration data of the connecting port.

In addition, the present invention provides a configuration generating apparatus for devices to solve the problems of the prior art.

In one embodiment of the present invention, the device configuration generating apparatus is applied to at least one external device. The configuration generating apparatus for devices comprises the at least one connecting port, the storage unit, and the controller. The connecting port respectively used to connect the at least an external device, wherein the connecting port is corresponded to a communication protocol type. The storage unit is configured to store a sequence list. The sequence list comprises a plurality of device data, wherein each of the device data is corresponding to a communication protocol. The device data with the communication protocol of ccTalk protocol is categorized in a first priority group of the sequence list. The device data with the communication protocol of MDB protocol is categorized in the third sequence group of the sequence list. The device data other than those of the first priority group and the third priority group is categorized in a second priority group of the sequence list. The device data is sequenced on the sequence list according to the sequence of the first priority group, the second priority group, and the third priority group. The controller is connected to the connecting port and the storage unit. The controller tests the external device sequentially and generates a communication result according to the sequence list and the device data corresponding to the communication protocol type of the at least connecting port, and then generates a connecting port configuration file of the connecting port according to the communication result.

Wherein, the controller is configured to test the external device connected to the connecting port by a plurality of common commands, wherein each of the common commands is corresponding to a plurality communication protocol type. When the external device conforms to one of the common commands in the common commands, the controller judges the connecting port connected to the at least one external device that is conformed to the common commands as the connecting port of the communication protocol type corresponding to the common command.

Wherein, each of the device data comprises a device address data in a sequence list. When the device address data of the at least one device data is blank. The device data is sequenced prior to those in the first priority group.

Wherein, the storage unit is configured to store a history configuration file. The history configuration file comprises a history configuration parameter corresponding to the connecting ports, and the controller tests the at least one external device connected to the at least one connecting port by the history configuration parameter, and the controller deletes the history configuration parameter when the at least one external device does not conform to the history configuration file.

Wherein, the device configuration generating apparatuses further comprises a warning module connected to the controller. When the controller tests the external device connected to the connecting ports according to the history configuration parameter and the device data in the sequence list, and when the external device does not conform to the history configuration parameter, the controller generates a warning signal, and the warning module generates a warning message according to the warning signal.

Wherein, each of the device data in the sequence list comprises a device configuration parameter. The controller sequentially tests the external device according to the sequence list and the device configuration parameter of the device data corresponding to the communication protocol type of the at least one connecting port. When the connecting port is conformed to the device configuration parameters, the controller updates the device configuration parameter into the connecting ports configuration date of the connecting ports.

In summary, the configuration generating method for devices of the present invention can, through the common commands, automatically judge whether each of the connecting ports connects external devices or not, and can also automatically detect the communication protocol type of each connecting ports, which not only improves the efficiency but also reduces the labor cost. Furthermore, the configuration generating method for devices of the present invention can test the configuration parameters with fast test speed by the sequence priority of sequence list and automatically find out the corresponding device data to test according to communication protocol of the connecting port, which doesn't need to compare each of the data, thereby reducing the testing time. In additional, the configuration generating method for devices of the present invention can automatically generate the connecting port configuration file of corresponding external device and can automatically update and detect the configuration file of the connecting port, thereby reducing the testing cost, shortening the development time and improving the detection efficiency.

BRIEF DESCRIPTION OF THE APPENDED DRAWINGS

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

Figure 1:
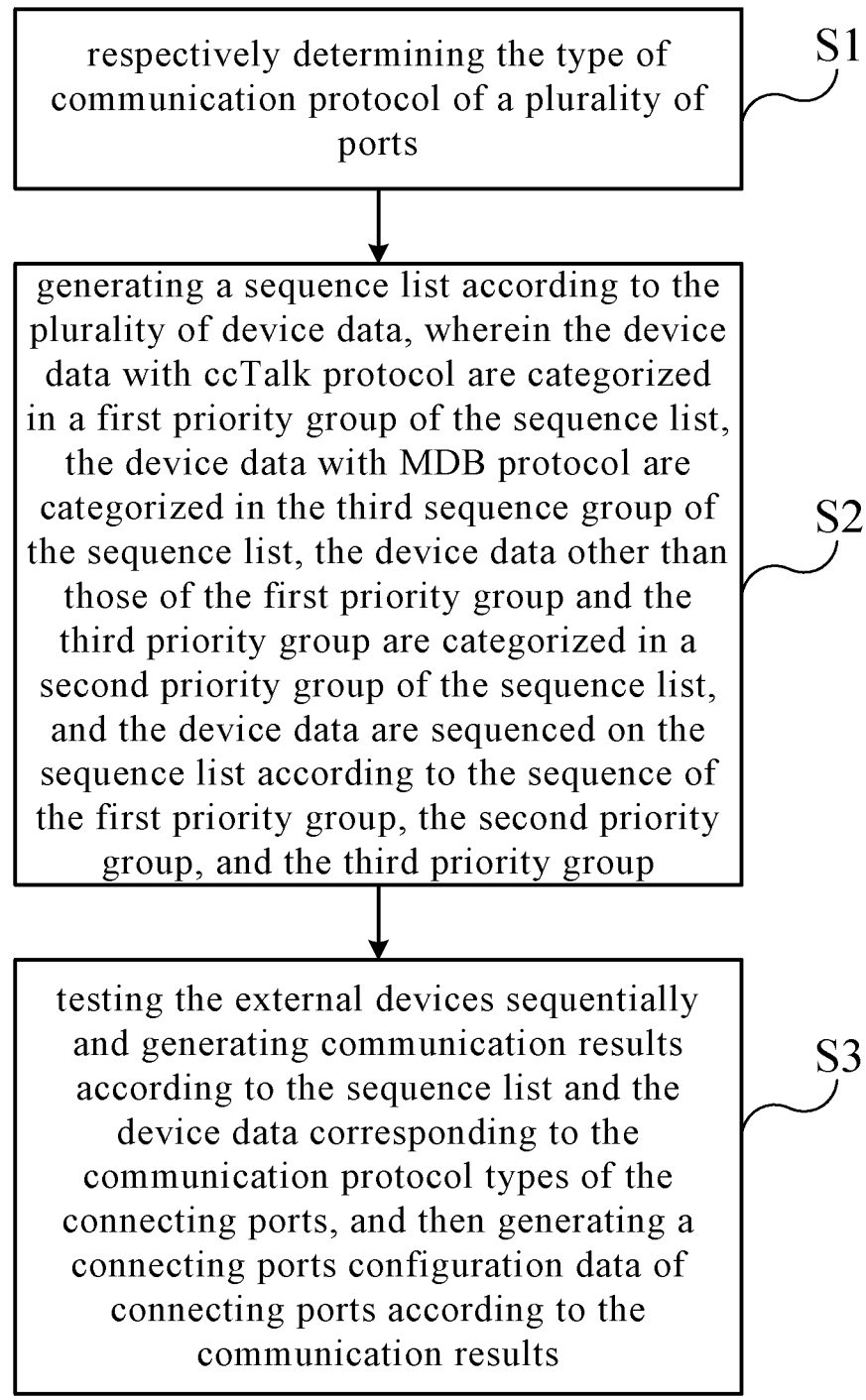
FIG. 1 is a process flow chart illustrating a configuration generating method for devices according to an embodiment of the present invention.
Figure 2:
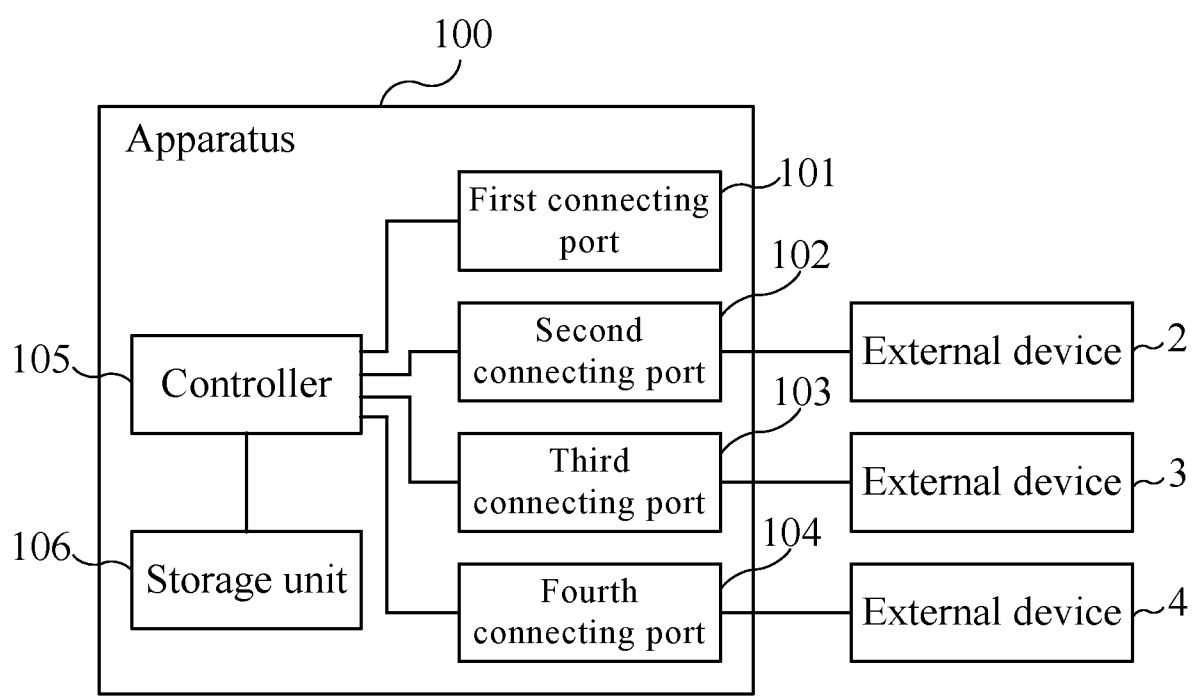
FIG. 2 is a function block diagram illustrating an apparatus and external devices according to an embodiment of the present invention.

Please refer to FIG. 1 and FIG. 2. FIG. 1 is a process flow chart illustrating a configuration generating method for devices according to an embodiment of the present invention. FIG. 2 is a function block diagram illustrating an apparatus 100 and external devices 2, 3, 4 according to an embodiment of the present invention. As shown in FIG. 1, in this embodiment, the configuration generating method comprises the following steps: step S1: determining a communication protocol type of each of the connecting ports respectively; step S2: generating a sequence list according to the plurality of device data, wherein each of the device data is corresponding to a communication protocol, the device data with the communication protocol of ccTalk protocol are categorized in a first priority group of the sequence list, the device data with the communication protocol of MDB protocol are categorized in the third sequence group of the sequence list, the device data other than those of the first priority group and the third priority group are categorized in a second priority group of the sequence list, and the device data are sequenced on the sequence list according to the sequence of the first priority group, the second priority group, and the third priority group; and step S3: testing the external devices sequentially and generating communication results according to the sequence list and the device data corresponding to the communication protocol types of the connecting ports, and then generating a connecting ports configuration data of connecting ports according to the communication results. Therefore, the configuration generating method for devices of the present invention can automatically judge the types of the communication protocols of the connecting port and the external device, and can automatically sequence the priority of testing. Also, the configuration generating method for devices of the present invention can test the communication between the connecting port and external device and establish the configuration file of the connecting port according to the device data in the sequence list.

In the embodiment, the apparatuses 100 comprises a first connecting port 101, a second connecting port 102, a third connecting port 103, and a fourth connecting port 104. The apparatuses 100 is connected to three external devices 2, 3, 4. Wherein, the second connecting port 102 is connected to the external devices 2, the third connecting port 103 is connected to the external devices 3, and the fourth connecting port 104 is connected to the external devices 4. In practice, the apparatuses 100 can be a computer, an industrial computer or a server. The quantity of the connecting ports of the apparatuses 100 is not limited to 4 as shown in FIG. 2, and it can be 1, 2, 3 or more than 4. The external devices 2, 3, 4 can use the wired connection to be respectively connected to the connecting ports of the apparatuses 100. The quantity of the external devices is not limited to 3 as shown in FIG. 2, and it can be 1, 2 or the corresponding quantity of the connecting ports.

Figure 3:
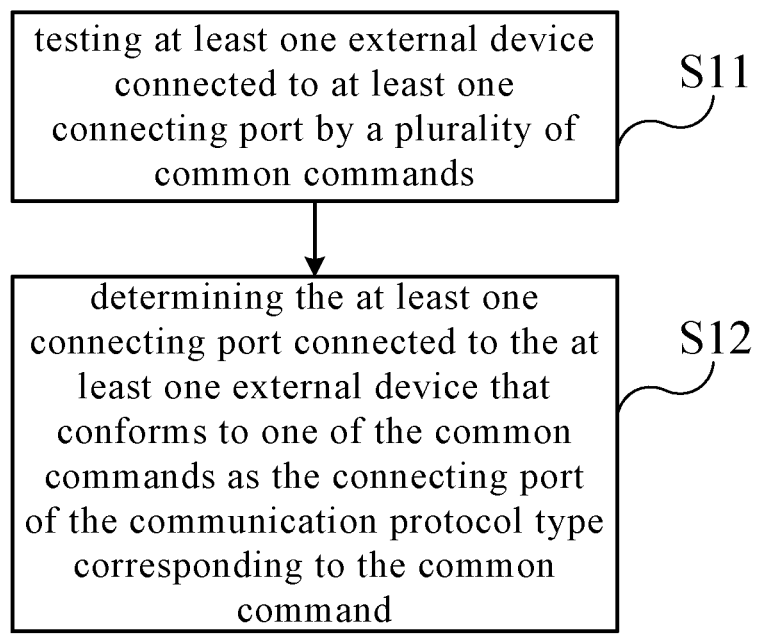
FIG. 3 is a process flow chart illustrating the configuration generating method for devices in FIG. 1.

Please refer to FIG. 1, FIG. 2 and FIG. 3. FIG. 3 is a process flow chart illustrating the configuration generating method for devices in FIG. 1. As shown in FIG. 1 and FIG. 3, the step S1 in FIG. 1 further comprises the following steps: step S11: testing at least one external device connected to at least one connecting port by a plurality of common commands, wherein each of the common commands is corresponding to one communication protocol type; and step S12: determining the at least one connecting port connected to the at least one external device that conforms to one of the common commands as the connecting port of the communication protocol type corresponding to the common command. In practice, the communication protocol type can be ccTalk, Smiley Secure Protocol (SSP), ID-003, EBDS, Transact Template Language (TTL), Multi-Drop Bus (MDB), etc. Each communication protocol type is respectively corresponding to one common command. The common command is the command or signal for detecting whether the connecting ports and external device can communicate.

In this embodiment, as shown in FIG. 2, the apparatuses 100 further comprises the controller 105 to connect the first connecting port 101, the second connecting port 102, the third connecting port 103, and the fourth connecting port 104. The controller 150 can respectively transmit the common commands to the external devices connected to the connecting ports, and detect and judge the types of the communication protocol of the connecting ports according to the replying signal from each of the connecting ports. In practice, the controller 105 can be a central processing unit (CPU). The controller 105 can sequentially transmit the common commands of the ccTalk, SSP, ID-003, EBDS, TTL/TCL, and MDB to the external device 2 through the second connecting port 102 when the external device 2 is connected with the second connecting port 102 of the apparatus 100. The transmitting sequence of the common commands of the controller 105 is not limited to the aforementioned sequence. When the controller 105 transmits the common command of SSR to the external device 2 and the second connecting port 102 replies the replying signal to the controller 105. The external device 2 connected to the second connecting port 102 would communicate with the second connecting port 102 with the SSR protocol. At this time, the controller 105 marks the communication protocol type of the second connecting port 102 as the SSR protocol. Similarly, the controller 150 can respectively transmit the common commands with various communication protocol types to the external devices 3 and 4, so as to detect and mark the communication protocol types of the third connecting port 103 and the fourth connecting port 104. Therefore, the configuration generating method for devices of the present invention can automatically mark the communication protocol type of the connecting port which is already connected to the external device.

The configuration generating method for devices of the present invention not only can mark the communication protocol type of the connecting port which is connected to the external device but also can identify the connecting port with specific communication protocol type which is even not connected to any external device. In one embodiment, when the controller 105 transmits a data signal to the first connecting port 101 and the first connecting port 101 replies the data signal directly to the controller 105, the controller 105 marks the communication protocol type of the first connecting port as the ccTalk protocol. In practice, the detection signal sent by controller 105 is not limited to the common commands but can be the data signal. Because the outputting pin (such as Tx pin) and the inputting pin (such as Rx pin) of the connecting port with ccTalk protocol use the same wire, the date signal replied by outputting pin of the first connecting port 102 is directly transmitted to the controller 105 through the inputting pin if the first connecting port 101 is the connecting port of the ccTalk protocol. At this time, the controller 105 marks the communication protocol type of the first connecting port 101 as the ccTalk according to the data signal transmitted by the inputting pin. Therefore, the device configuration generating method of the present invention can automatically judge whether each of the connecting ports connects an external device or not, and can automatically detect the communication protocol type of each connecting port, so as to improve the efficiency and reduce the labor cost.

Figure 4:
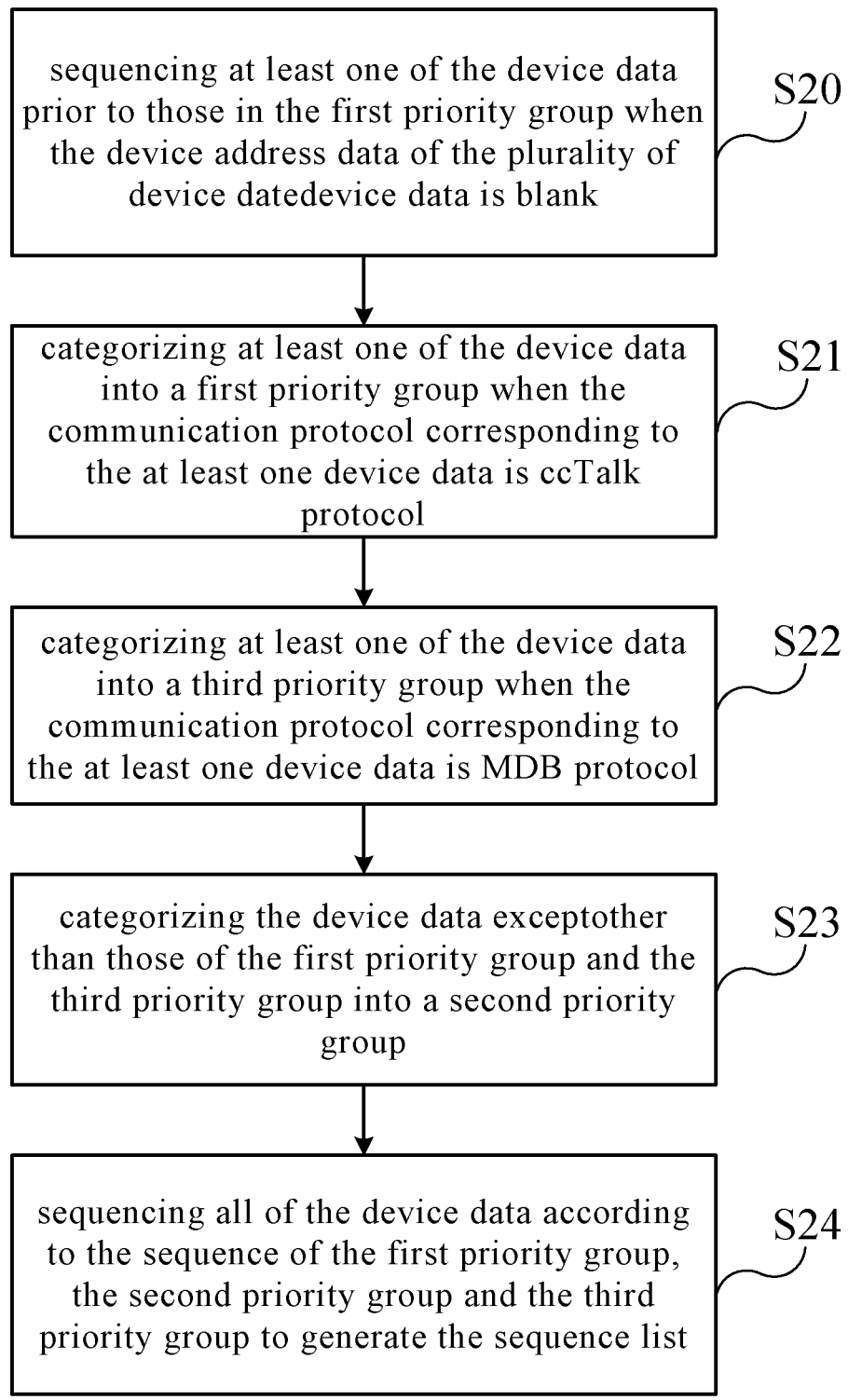
FIG. 4 is a process flow chart of the test sequencing method for devices in the configuration generating method for devices of FIG. 1.

Please refer to FIG. 1, FIG. 2 and FIG. 4. FIG. 4 is a process flow chart of the test sequencing method for devices in the configuration generating method for devices of FIG. 1. As shown in FIG. 1 and FIG. 4, step S21 to step S24 in FIG. 4 is the test sequencing method for devices for generating the sequence list in step S2 of FIG. 1. Step S2 of FIG. 1 further comprises the following steps: step S21: categorizing at least one of the device data into a first priority group when the communication protocol corresponding to the at least one device data is ccTalk protocol; step S22: categorizing at least one of the device data into a third priority group when the communication protocol corresponding to the at least one device data is MDB protocol; step S23: categorizing the device data other than those of the first priority group and the third priority group into a second priority group; and step S24: sequencing all of the device data according to the sequence of the first priority group, the second priority group and the third priority group to generate the sequence list.

In practice, the sequence list can comprise a plurality of device data, and each device data can be corresponding to an external device. The device data can comprise names, models, device address data and communication protocols of the external device. Wherein, the device address data is the data for identifying the external device. In practice, the device address data can be, but not limited to, a value expressed by decimal or hexadecimal numbers. Each of the device data of the external devices respectively comprises the device address data and each device address data of the device data are difference from each other when the external devices are connected to a bus. The communication protocol type can be, but not limited to, one of ccTalk, Smiley Secure Protocol (SSP), ID-003, EBDS, Transact Template Language (TTL), and Multi-Drop Bus (MDB), etc. The sequence of the plurality of device data on the sequence list can be determined according to the detection speed of the communication protocol. The ccTalk protocol can be detected rapidly by broadcast and doesn't need to be detected by loop test program. Therefore, the device data of the ccTalk protocol is categorized into the first priority group in the sequence list. Furthermore, the MDB protocol has the special detection specifications and the complex detection logic, so that the device data of the communication protocol type considered as the MDB protocol is categorized into the third priority group in sequence list. The other device data of the communication protocol type, not considered as the ccTalk protocol and MDB protocol, are categorized into the second priority group. Please notice that the quantity of device data in the first priority group, second priority group, and third priority group can be 1, 2, or more then 3.

In this embodiment, it further comprises the following step: step S20: sequencing at least one of the device data prior to those in the first priority group when the device address data of the plurality of device data is blank. In practice, the communication protocol type of the device data comprises the range of device address data when the device data comprises the device address data. At this time, the device data uses the loop test program to detect the communication protocol of the corresponding data. The device data does not need the loop test program to detect when the device address data of device data is blank. Therefore, the device data is set in the priority sequence before the first priority group when the device address data is blank.

Furthermore, the device data can be categorized according to the detection speed of the communication protocol type when the device address data of two or more device data in sequence list is blank. For example, the sequence list comprises the device data A, device data B, and device data C. The device address data of the device data A, device data B, and device data C is blank and the communication protocol types respectively are the MDB, ccTalk, and TTL. At this time, the categorization of the sequence list can be the device data B, device data C, and device data A. In additional, the categorization of first priority group, second priority group, and third priority group can be determined according to the name, number of strokes of model or the numerical size of the device address data when the first priority group, second priority group, and third priority group comprise the plurality of data.

In this embodiment, as shown in FIG. 1 and FIG. 2, the apparatus 100 further comprises the storage unit 106 which is connected to the controller 105, and the storage unit 106 is configured to store the sequence list. In practice, the sequence list can be stored by importing or writing. The controller 105 tests the connecting port of the external device sequentially and generates a communication result according to the sequence list, finding out from the storage unit 106 and the device data corresponding to the communication protocol type when the controller 105 marks the communication protocol type of each connecting port in the apparatuses 100. The controller 105 generates and establishes the connecting port configuration file of the connecting port when the communication result is successful. In practice, the device data further comprises the device configuration parameters of the external device. The controller 105 uses the device configuration parameter setting connecting port of the device data to form the communication. The connecting port can communicate with the external device when the device configuration parameter of the connecting port and external device are the same.

For example, the communication protocol types of the third connecting port 103 is set as the ccTalk protocol. The first priority group in sequence list comprises the device data A and device data B. The controller 105 selects the device data of the first priority group in the sequence list according to the ccTalk of the third connecting port 103, and then the controller 105, through the third connecting port 103, uses the device configuration parameters of device data A and device data B sequentially to test the external device 3 when the controller 105 detects the external device 3 connecting to the third connecting port 103. If the controller 105 uses the configuration parameter of device data A to test the external device 3 and the third connecting port 103 replies that the communication result is unsuccessful or unresponsive, it represents that the device data A is not the external device 3 connected the third connecting port 103. At this time, the controller 105 uses the configuration parameter of device data B to test the external device 3. If the controller 105 uses the configuration parameter of device data B to test the external device 3 and the third connecting port 103 replies that the communication result is successful, it represents that the device data B is the external device 3 connected the third connecting port 103. At this time, the controller 105 establishes the third configuration file comprising the device data B. Therefore, the device configuration generating method of the present invention can automatically find out the corresponding device data to test according to the communication protocol type of the connecting port, and the priority tests based on the sequence of the sequence list can get the configuration parameters of the test results quickly, thereby improving efficiency. In additional, the device configuration generating method of the present invention can automatically generate the connecting port configuration file of the corresponding external device and can automatically update and detect the configuration file of the connecting port, thereby, reducing the testing cost, shortening the development time, and improving the detection efficiency.

The device configuration generating method of the present invention can test sequence according to the communication protocol type sequence of the connecting port. In one embodiment, the controller 105 of apparatuses 100 detects sequence to be the third connecting port 103, the fourth connecting port 104, and the second connecting port 102 respectively when the second connecting port 102, third connecting port 103, and the fourth connecting port 104 are respectively considered as the MDB protocol, ccTalk protocol and EBDS protocol. In additional, the device configuration generating method of the present invention can test sequence according to the number of the connecting port when the plurality of connecting ports are the same communication protocol. In one embodiment, the controller 105 of the apparatus 100 detects the second connecting port 102 firstly, and then detects the fourth connecting port 104 when the communication protocol types of the second connecting port 102 and fourth connecting port 104 are considered as the ccTalk protocol.

Figure 5:
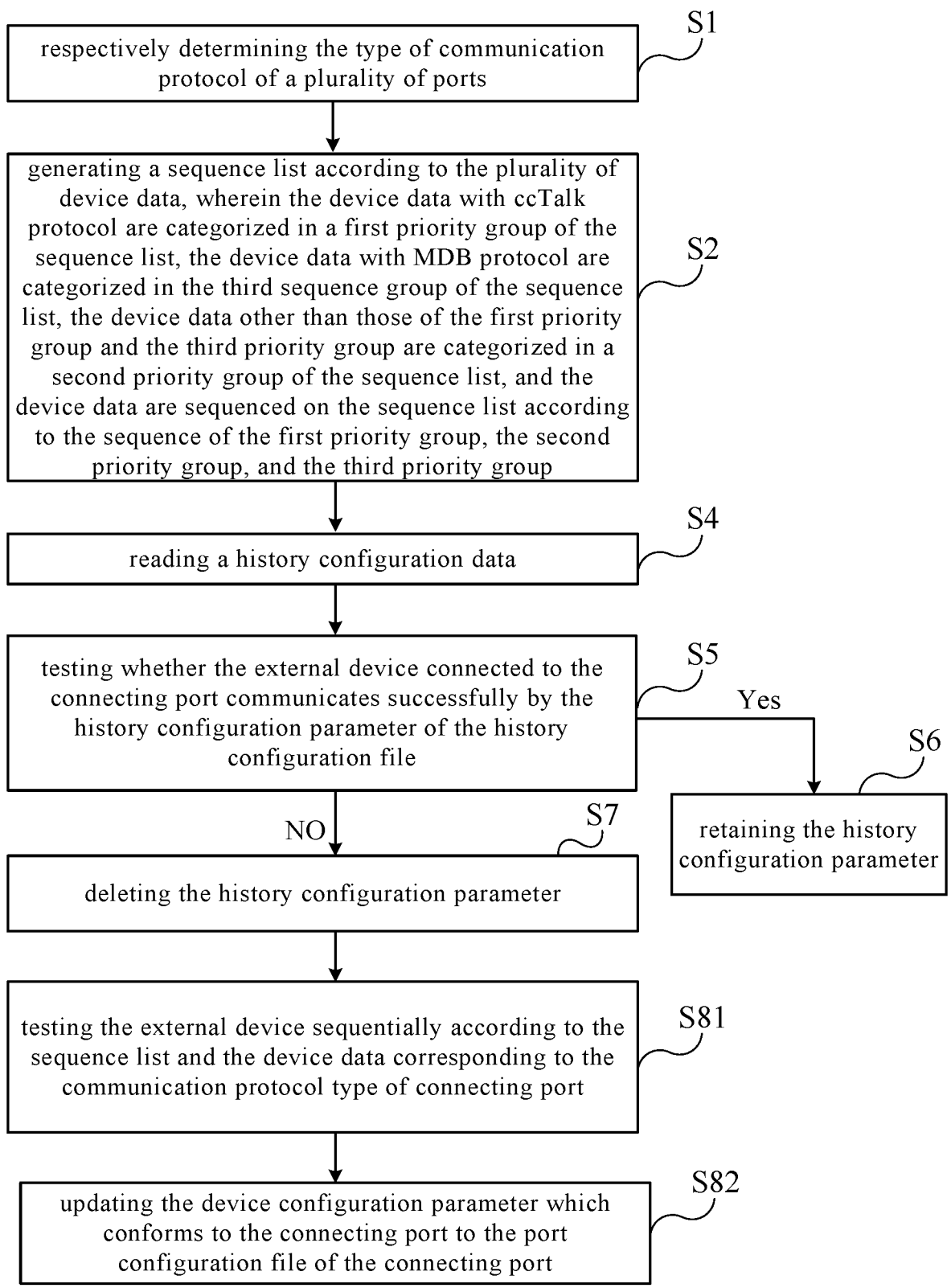
FIG. 5 is a process flow chart illustrating configuration generating method for devices according to another embodiment of the present invention.

In practice, the apparatuses may have stored the configuration file of the connecting port. Therefore, the device configuration generating method can be the aforementioned embodiment of the present invention, but also can be the other embodiment. Please refer to FIG. 2 and FIG. 5. FIG. 5 is a process flow chart illustrating configuration generating method for devices according to another embodiment of the present invention. The difference between this embodiment and the aforementioned embodiment is the device configuration generating method of this embodiment further comprises the following step: step S4: reading a history configuration file, wherein the history configuration file comprises the history configuration parameter corresponding to the connecting ports; and step S5: testing whether the external device connected to the connecting port communicates successfully by the history configuration parameter of the history configuration file. Wherein, the step S4 and the step S5 are operated before the connecting port configuration file of generating connecting port. If the communication result is successful, and then implement step S6: retaining the history configuration parameter. If the communication result is unsuccessful, and then implement step S7: deleting the history configuration parameter. Next, implement step S81: testing the external device sequentially according to the sequence list and the device data corresponding to the communication protocol type of connecting port; and step 82: updating the device configuration parameter which conforms to the connecting port to the port configuration file of the connecting port.

In practice, the history configuration file can be stored in the storage unit 106. The history configuration parameter of the history configuration file can be the history configuration parameter corresponding to the connecting port. The controller 105 reads the history configuration file from the storage unit 106 and finds out the history configuration parameter corresponding to the connecting port when the controller 105 detects that the external device is connected to the connecting port. Then, the controller 105 uses the history configuration parameter of corresponding to the connecting to test the external device of connecting the connecting port. The history configuration parameter is considered as the external device of connecting the connecting port when the connecting port replies that the communication result is successful. At this time, the controller 105 retains the history configuration parameter of the corresponding connecting port, and then continuingly tests the next connecting port. The history configuration parameter is not considered as the external device of connecting the connecting port when the connecting port replies that the communication result is unsuccessful. At this time, the controller 105 deletes the history configuration parameter, which is corresponded to the connecting port. After that, the controller 105 sequentially tests the external device of connecting the connecting port and generates the communication result, and the controller 105 finds out the device data of communication protocol type of the corresponding connecting port from the sequence list. The controller 105 updates the device configuration parameter in the device data to the connecting port configuration file of connecting port when the communication result is successful. Therefore, the device configuration generating method of the present invention can automatically update and detect the error of configuration parameter of the connecting port, thereby reducing the time cost and improving the detection efficiency.

In one embodiment, the apparatuses further comprise a warning module connected to the controller. When the controller 105 tests the external device connected to the connecting port according to the history configuration parameter and the device configuration parameter of all device data in sequence list, and then the connecting port replies that the communication result is unsuccessful, the controller generates the warning signal to the warning module. And, the warning module generates a warning message according to the warning signal. In practice, the warning signal can be sound, light, texts, images, etc. The warning module generates a warning message when the controller can't use the history configuration file and all device data in the sequence list to establish the connecting port configuration file of the connecting port. The engineer can determine and remove the follow-up obstacle according to the warning message.

Figure 6:
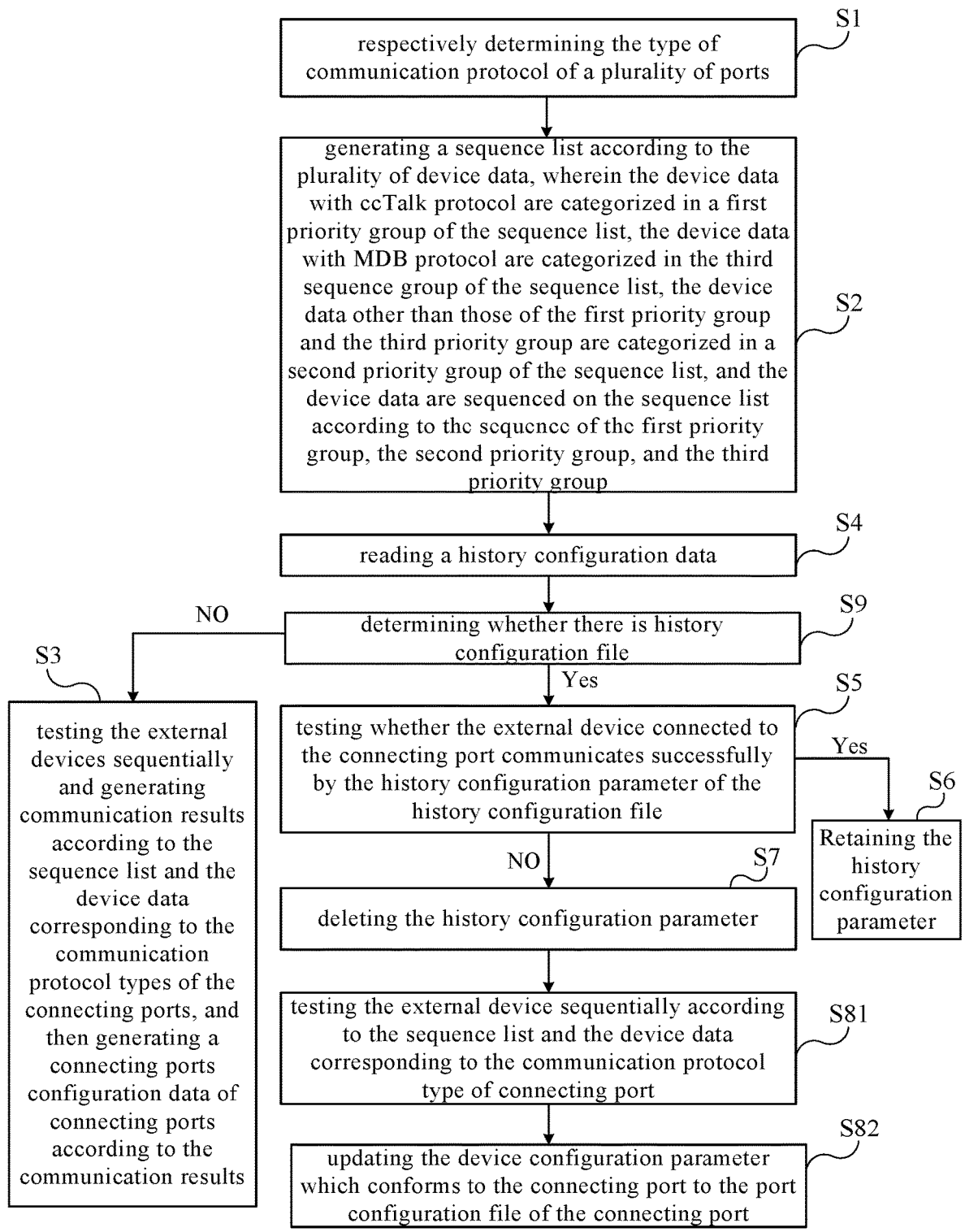
FIG. 6 is a process flow chart illustrating a configuration generating method for devices according to another embodiment of the present invention.

Please refer to FIG. 2 and FIG. 6. FIG. 6 is a process flow chart illustrating a configuration generating method for devices according to another embodiment of the present invention. The difference between this embodiment and the aforementioned embodiment is described in the following. After reading the history configuration file in step S4, the device configuration generating method further comprises the following step: step S9: determining whether there is the history configuration file or not. In practice, the controller 105 of the apparatus 100 can further determine whether the history configuration file stored in the storage unit 106 comprises the history configuration parameter of each connecting port or not. If yes, the controller 105 implements step S5, and then respectively implements the step S6, step S7, step S81, and step S82 according to the judgment result of the step S5. Wherein, the step S5, step S6, step S7, step S81, and step S82 is roughly the same as the correspondingly steps in the embodiment of FIG. 5. Therefore, they are not repeated herein. If no, it is considered that the history configuration file read by the controller 105 is blank or the configuration file of each of the connecting port in the apparatuses 100 is not comprised. At this time, the controller 105 implements step S3 and generates the connecting port configuration file of the connecting port. The step S3 is roughly the same as the correspondingly steps in the embodiment of FIG. 1, which are not repeated herein. Therefore, the device configuration generating method of the present invention can automatically judge whether the history configuration file is comprised or not, further to establish and update the connecting port configuration file of the connecting port, thereby reducing the time cost and improving the detection efficiency.

In summary, the configuration generating method for devices of the present invention can, through the common commands, automatically judge whether each of the connecting ports connects external devices or not, and can automatically detect the communication protocol type of each connecting ports, which not only improves the efficiency but also reduces the labor cost. Furthermore, the configuration generating method for devices of the present invention can test the configuration parameters with fast test speed by the sequence priority of the sequence list and automatically find out the corresponding device data to test according to communication protocol of the connecting port and don't need to compare each of the data, thereby reducing the testing time. In additional, the configuration generating method for devices of the present invention can automatically generate the connecting port configuration file of the corresponding external device and can automatically update and detect the configuration file of the connecting port, thereby reducing the testing cost and shortening the development time and improving the detection efficiency.

What is claimed is:

1. A test sequencing method for devices configured to generate a sequence list for testing an external device connected to a connecting port, the sequence list comprising a plurality of device data wherein each of the device data corresponds to a communications protocol, the test sequencing method for devices comprising the following steps:

categorizing at least one of the device data into a first priority group when the communication protocol corresponding to the at least one device data is ccTalk protocol;

categorizing at least one of the device data into a third priority group when the communication protocol corresponding to the at least one device data is MDB protocol;

categorizing another of the device data different from the at least one of the device data in the first priority group and the at least one of the device data in the third priority group into a second priority group; and sequencing all of the device data according to a sequence of the first priority group, the second priority group and the third priority group to generate the sequence list.

2. The test sequencing method for devices of claim 1, wherein each of the device data may comprise a device address data, and the test sequencing method for devices further comprises a following step:

sequencing at least one of the device data prior to those in the first priority group when the device address data of the at least one device data is blank.

3. A configuration generating method for devices applied to a plurality of connecting ports and applied to at least one external device respectively connected to the connecting ports, the configuration generating method for devices comprising following steps:

determining a communication protocol type of each of the connecting ports respectively;

generating a sequence list according to a plurality of device data, wherein each of the device data is corresponding to a communication protocol, at least one of the device data uses a communication protocol of ccTalk protocol and is categorized in a first priority group of the sequence list, at least one of the device data uses a communication protocol of MDB protocol and is categorized in the third sequence group of the sequence list, and the other of the device data different from the at least one of the device data in the first priority group and the at least one of the device data in the third priority group is categorized in a second priority group of the sequence list, and the device data are sequenced on the sequence list according to a sequence of the first priority group, the second priority group, and the third priority group; and testing the at least one external device sequentially and generating a communication result according to the sequence list and the at least one device data corresponding to the communication protocol type of the at least one connecting port, and then generating a port configuration file of the at least one connecting port according to the communication result.

4. The configuration generating method for devices of claim 3, wherein the step of determining the communication protocol type of each of the connecting ports respectively further comprises following steps:

testing the at least one external device connected to the at least one connecting port by a plurality of common commands, wherein each of the common commands is corresponding to one communication protocol type; and determining at least one connecting port connected to at least one external device that conforms to one of the common commands as a connecting port of the communication protocol type corresponding to the common command.

5. The configuration generating method for devices of claim 3, wherein each of the device data may comprise a device address data, and the configuration generating method for devices further comprises a following step:
   sequencing at least one of the device data prior to those in the first priority group when the device address data of the at least one device data is blank.

6. The configuration generating method for devices of claim 3, before the step of testing the at least one external device sequentially and generating a communication result according to the sequence list, further comprising a following step:
   reading a history configuration file, wherein the history configuration file comprises a history configuration parameter corresponding to the connecting ports;
   testing the at least one external device connected to the at least one connecting port by the history configuration parameter; and
   deleting the history configuration parameter when the at least one external device does not conform to the history configuration file.

7. The configuration generating method for devices of claim 6, wherein each of the device data comprises a device configuration parameter, and in the step of testing the at least one external device sequentially and generating a communication result according to the sequence list, the configuration generating method for devices further comprises following steps:
   testing the at least one external device sequentially according to the sequence list and a device configuration parameter of at least one device data corresponding to the communication protocol type of the at least connecting port; and
   updating at least one device configuration which conforms to the at least one connecting port to a port configuration file of the connecting port.

8. A configuration generating apparatus for devices, applied to at least one external device, and the configuration generating apparatus comprising:
   at least one port, respectively used to connect the at least an external device, wherein at least one port corresponds to a communication protocol type;
   a storage unit configured to store a sequence list, the sequence list comprising the plurality of device data, wherein each of the device data is corresponding to a communication protocol, at least one of the device data uses a communication protocol of ccTalk protocol and is categorized in a first priority group of the sequence list, at least one of the device data uses a communication protocol of MDB protocol and is categorized in the third sequence group of the sequence list, and a device data other than those of the first priority group and the third priority group is categorized in a second priority group of the sequence list, and the device data are sequenced on the sequence list according to a sequence of the first priority group, the second priority group, and the third priority group; and
   a controller connected to at least one connecting port and the storage unit, the controller testing the at least one external device sequentially and generating a communication result according to the sequence list and the at least one device data corresponding to the communication protocol type of the at least one connecting port, and then generating a connecting port configuration file of the at least one connecting port according to the communication result.

9. The configuration generating apparatus for devices of claim 8, wherein the controller is configured to test at least one external device to the at least one connecting port by a plurality of common commands, wherein each of the common commands is corresponding to one communication protocol type, when the at least one external device conforms to one of the common commands in the common commands, the controller determines the at least one connecting port connected to the at least one external device that conforms to one of the common commands as a connecting port of the communication protocol type corresponding to the common command.

10. The configuration generating apparatus for devices of claim 8, wherein each of the device data may comprise a device address data, and wherein, in the sequence list, at least one of the device data is sequenced prior to those in the first priority group when the device address data of the at least one device data is blank.

11. The configuration generating apparatus for devices of claim 8, wherein the storage unit is configured to store a history configuration file, the history configuration file comprising a history configuration parameter corresponding to the at least one connecting port, and the controller tests the at least one external device connected to the at least one connecting port by the history configuration parameter, and the controller deletes the history configuration parameter when the at least one external device does not conform to the history configuration file.

12. The configuration generating apparatus for devices of claim 11, further comprising a warning module connected to the controller, wherein the controller tests the at least one external device connected to the at least a connecting port according to the history configuration parameter and the device data in the sequence list, and when the at least one external device does not conform to the history configuration parameter, the controller generates a warning signal, and the warning module generates a warning message according to the warning signal.

13. The configuration generating apparatus for devices of claim 8, wherein each of the device data in the sequence list comprises a device configuration parameter, the controller sequentially tests the at least one external device according to the sequence list and the device configuration parameter of at least one device data corresponding to the communication protocol type of at least one connecting port when the at least one connecting port conforms to the device configuration parameters, and the controller updates the device configuration parameter with a connecting port configuration data of the at least one connecting port.

* * * * *